United States Patent [19]

Schneider et al.

[11] Patent Number: 4,547,412

[45] Date of Patent: Oct. 15, 1985

[54] HEATING FOAM CONTAINER IN UNRESTRICTED STATE TO INCREASE STIFFNESS

[75] Inventors: Daniel J. Schneider, Cadott, Wis.; Jeffrey S. Reiter, Los Altos Hills, Calif.

[73] Assignee: Standard Oil Company (Indiana), Chicago, Ill.

[21] Appl. No.: 540,318

[22] Filed: Oct. 11, 1983

[51] Int. Cl.$^4$ .................... B65D 11/20; B32B 31/26
[52] U.S. Cl. .................................... 428/35; 156/83; 264/321; 428/318.6; 428/913
[58] Field of Search ............... 156/78, 83, 322, 308.6; 428/318.6, 913, 35; 264/321

[56] References Cited

U.S. PATENT DOCUMENTS

| | | | |
|---|---|---|---|
| 3,260,781 | 7/1966 | Lux et al. ............................ | 264/321 |
| 3,344,222 | 9/1967 | Shapiro et al. .............. | 156/308.6 X |
| 3,616,020 | 10/1971 | Whelan et al. ............. | 156/244.27 X |
| 3,669,794 | 6/1972 | Mazur .......................... | 156/309.9 X |
| 3,967,991 | 7/1976 | Shimano et al. ................ | 156/218 X |
| 4,359,160 | 11/1982 | Myers et al. .................... | 264/321 X |

*Primary Examiner*—Robert A. Dawson
*Attorney, Agent, or Firm*—David E. Boone; Ralph C. Medhurst; William T. McClain

[57] ABSTRACT

A method of improving the stiffness of a polystyrene foam container having a sidewall and a bottom, said container having been prepared from a laminate of polystyrene foam having generally spherical closed cells, and, on at least the outer surface thereof, a layer of solid polystyrene; said method comprising heating said container in the unrestrained state, said heating being sufficient to increase the thickness of the sidewall at least 10%, and cup produced by this method.

8 Claims, No Drawings

HEATING FOAM CONTAINER IN UNRESTRICTED STATE TO INCREASE STIFFNESS

This invention relates to a foam cup which has been treated to improve the strength thereof. The cup is made from a foam resin sheet produced by the blown bubble technique to which a solid resin layer is applied to one or both sides of the foam.

Foam cups are widely used for individual servings of hot beverages, such as coffee and soup, and cold beverages such as soft drinks. Many millions are used every day. Obviously, the cup must have sufficient strength to permit handling by the user, but, at the same time, use a minimum amount of resin for the product. Polystyrene and other resins can be used to produce the cup although the majority are now made from polystyrene.

Broadly, the process of our invention resides in a method of improving the stiffness of a polystyrene foam container having a sidewall and a bottom, said container having been prepared from a laminate of polystyrene foam having generally spherical closed cells, and, on at least the outer surface thereof, a layer of solid polystyrene, said method comprising heating said container in the unrestrained state, said heating being sufficient to increase the thickness of the sidewall at least 10%.

The sidewall prior to heating has a thickness of 0.02 to 0.05 inch and said heating is carried out under conditions to provide an increase in thickness of from 10 to 30 percent. The heating can be applied by a variety of methods such as contact with hot water, steam, hot air, or infrared radiation. The cups produced by us in the work reported herein were produced on a G1000 VII machine of Paper Machinery Corporation of Milwaukee, Wis. This company is widely known as a major producer of machines for the production of paper cups. In the production system, the cups of this invention were prepared from single-side-coated roll stock produced according to the method of disclosure by Mazur U.S. Pat. No. 3,669,794 (1972). Double-coated stock can also be used, this method being disclosed in Whelan, et al., U.S. Pat. No. 3,616,020 (1971).

In the Paper Machinery Corporation machine, a source of hot air is provided to seal the side seam resulting, after the side wall is rolled into shape, and to seal the bottom of the cup with the sidewall. In the machine, a source of air, heated by a flameless torch, blows the finished cup into a stacking device. It will be recognized that time and temperature of treatment are interrelated, runs were made using a treatment time of 3 to 5 seconds with heated air in the range of 250° to 400° F.

Heating foam cups has been disclosed as a method of improving the strength of containers. One example of this is Shapiro et al. U.S. Pat. No. 3,344,222 (1967). In this patent, foam cups produced by extrusion of foamable sheets of polystyrene are made, no solid layer being present, and the foam cups treated while holding the cup between restraining surfaces. This is said to provide a density gradient with denser foam near the surface of the cup, thus increasing the strength of the cup. According to the patentee, the thickness of the wall or walls of the container does not apparently change. The patentee also states that a wall gradient of two or three times the original thickness will severely impair the formation of the dense surface walls and the heat-insulating interior zones.

It will be seen that the present process which heats the cup or container in the unrestrained state is directly contrary to the teaching of Shapario et al.

Another patent which requires an increase in thickness when a foam cup is heated is Myers, et al., U.S. Pat. No. 4,359,160 (1982), this patent being directed to a thermoformed cup or container. The sheet for the thermoforming operation is provided by extrusion of molten polystyrene containing a blowing agent and a nucleating agent from a slit-ring orifice. This product, like the product of the invention, contains closed, generally spherical closed cells as extruded. In the process of Myers, et al., this sheet is thermoformed by a plug-system method which stretches the cells and produces a product containing "pancake"-shaped cells. Upon heating this thermoformed cup, as when hot liquid is added thereto, the cells tend to return to spherical shape.

Thus, the cup of Myers et al., while probably being stronger after filling with hot liquid, is still deficient because it does not have the improved strength prior to use by the user.

From the above description, it is obvious that the object of this invention is to provide a coated foam cup of improved strength.

A further object of this invention is to provide a method for producing this container. Other objects of this invention will become apparent to those skilled in the art upon reading this disclosure.

The following examples set forth currently preferred embodiment of the invention, but these examples should not be considered unduely limiting.

EXAMPLE 1

Amoco R2 polystyrene resin was extruded by the blown bubble technique using butane in an amount of 4 wt. percent as a blowing agent and a talc nucleating agent in an amount of 0.5 to 0.75 wt. percent, all weights being based upon the amount of polystyrene. The production system is well-known. After slitting and opening of the sheet to a flat structure, the sheet was fed between nip rollers into which nip was extruded a polystyrene solid resin. The solid resin was a 50-50 mixture of Amoco R2 and Amoco H2R polystyrene, the mixture containing, as a pigment, 2 to 4 wt. percent of $TiO_2$. A good bond was obtained with this system. The foam thickness was slightly less than 0.03 inch and the solid resin thickness was approximately 0.002 inch.

The procedure for the showing of sidewall deflective strength improvement consisted of first measuring the untreated cup sidewall thickness and the sidewall deflective strength and then carrying out the heating procedure. For this example, the heating consisted of pouring boiling water into the 9 oz. cups brim full and covering each cup with another cup so that the covering cup was heated by the steam given off by the hot water. These pairs of cups were left in this position for 15 minutes to allow the foam to expand freely. After this time, the sidewall thickness and deflective strength were again measured.

The sidewall deflective strength test is made on the full cup. Each is placed on a platform on its side using a flat strip pressing against the upper portion of the rim. A gram scale is provided to apply a gradually increasing weight to the rim, and the deflection measured. The data show the load required for a half-inch deflection of the cup.

The data are shown in the following table, runs 1-3 being the bottom cups and runs 4-6 being the upper cups which were exposed to the steam.

| | SIDEWALL THICKNESS | | | SIDEWALL DEFLECTIVE STRENGTH (grams per ½") | | |
|---|---|---|---|---|---|---|
| Run | Untreated | Heated | Δ% | Untreated | Heated | Δ% |
| 1 | .028 | .032 | 13 | 230 | 280 | 18 |
| 2 | .027 | .036 | 25 | 265 | 310 | 15 |
| 3 | .027 | .034 | 21 | 260 | 310 | 16 |
| 4 | .028 | .037 | 24 | 270 | 315 | 14 |
| 5 | .027 | .035 | 23 | 260 | 300 | 13 |
| 6 | .027 | .035 | 23 | 245 | 295 | 17 |
| Ave. | .027 | .035 | 23 | 255 | 302 | 16 |

EXAMPLE 2

Cups made according to the procedure set forth in EXAMPLE 1 were treated with air heated with a flameless torch. With exposure times in the range of 3 to 5 seconds and air temperatures in the range of 250° to 400° F., increases in wall thickness and increased sidewall deflective strengths were obtained.

From the foregoing description, those skilled in the art will appreciate that the modification can be made without departing from the broad scope of the invention. It is not intended to limit the broad scope of the invention to those embodiments illustrated and described, but reasonable modifications can be made.

We claim:

1. A method for providing a finished polystyrene foam container having a sidewall and a bottom, said container having improved stiffness and being suitable for use with hot beverages, said method comprising:
   (1) forming a container from a laminate of polystyrene foam and, on at least the outer surface thereof, a layer of solid polystyrene by rolling said laminate into shape to form the side wall and subsequently sealing the bottom of the container to the sidewall, and
   (2) heating said container in an unrestrained state at a temperature sufficient to increase the thickness of the sidewall at least 10 percent and form the finished container which is then stacked prior to use.

2. The method of claim 1 wherein the sidewall, prior to heating, has a thickness of 0.02 to 0.05 inch, and said heating results in an increase in thickness of 10 to 30 percent.

3. The method of claim 1 wherein said heating is effected by contact of said container with hot water, steam, hot air, or infrared radiation.

4. A container produced by the process of claim 1.

5. The method of claim 1 wherein said heating is effected by contact of said container with hot air or infrared radiation and at temperature in excess of 250° F.

6. A method of providing a polystyrene foam container having a sidewall and a bottom, said container having improved stiffness and being suitable for use with hot beverages, said method comprising:
   (1) forming a container from a laminate of polystyrene foam and, on at least the outer surface thereof, a layer of solid polystyrene by rolling said laminate into shape to form the side wall and subsequently sealing the bottom of the container to the sidewall, and
   (2) heating said container in an unrestrained state by contacting said container with hot air or infrared radiation at a temperature in excess of 250° F., said heating being sufficient to increase the thickness of the sidewall at least 10 percent.

7. The method of claim 6 wherein said temperature is in the range of 250° F. to 400° F.

8. The method of claim 6 wherein the container is stacked after heating.

* * * * *